United States Patent [19]
Harrington

[11] Patent Number: 6,017,064
[45] Date of Patent: Jan. 25, 2000

[54] APPARATUS AND METHODS FOR FORMING LATERAL OPENINGS IN MAIN PIPELINES AND RESTRAINING APPARATUS FOR MAIN AND LATERAL PIPE JOINTS

[76] Inventor: Donald W. Harrington, 1513 Old Abert Rd., Lynchburg, Va. 24503

[21] Appl. No.: 09/073,823

[22] Filed: May 7, 1998

[51] Int. Cl.[7] .................................................. F16L 13/02
[52] U.S. Cl. .................. 285/21.3; 285/114; 285/133.21; 285/133.3; 285/197; 285/423
[58] Field of Search ..................... 285/114, 197, 285/198, 199, 135.2, 133.3, 133.4, 133.5, 133.6, 133.11, 133.21, 21.3, FOR 138, 423

[56] References Cited

U.S. PATENT DOCUMENTS

| | | |
|---|---|---|
| 389,180 | 9/1888 | Wiggins .................................. 285/136 |
| 2,387,154 | 10/1945 | Kalwitz ............................. 285/133.6 X |
| 3,649,055 | 3/1972 | Nilsen ................................ 285/21.3 X |
| 4,135,258 | 1/1979 | Braga et al. . |
| 4,761,024 | 8/1988 | Ewen . |
| 5,199,749 | 4/1993 | Corcoran . |
| 5,257,739 | 11/1993 | Pascaru . |

FOREIGN PATENT DOCUMENTS

| | | |
|---|---|---|
| 970792 | 7/1975 | Canada . |
| 0 552 710 | 7/1993 | European Pat. Off. . |
| 2038795 | 2/1990 | Japan ............................. 285/FOR 138 |
| 4025694 | 1/1992 | Japan ............................. 285/FOR 139 |
| 159899 | 10/1972 | Netherlands .................. 285/FOR 138 |
| 1620-765 | 1/1991 | U.S.S.R. . |
| 1139773 | 1/1969 | United Kingdom .......... 285/FOR 138 |

OTHER PUBLICATIONS

"Introducing Harco Push–On Joint Ductile Iron Fittings" brochure, The Harrington Corp.

*Primary Examiner*—Dave W. Arola
*Attorney, Agent, or Firm*—Nixon & Vanderhye

[57] ABSTRACT

In a piping system having a main pipe or fitting joined to a lateral pipe, a restraint body or sling extends about the fitting or main pipe and is secured at opposite ends to the lateral pipe. The lateral pipe, main pipe or fitting and restraint body are formed of plastic material. The restraint body includes a bend intermediate its ends for wrapping about the fitting or main pipe and has arcuate sections at its ends for solvent-welding to the lateral pipe. Any tendency toward separation of the lateral pipe and the main fitting or main pipe is resisted in tension by the restraint body and the joint is stress-relieved.

8 Claims, 4 Drawing Sheets

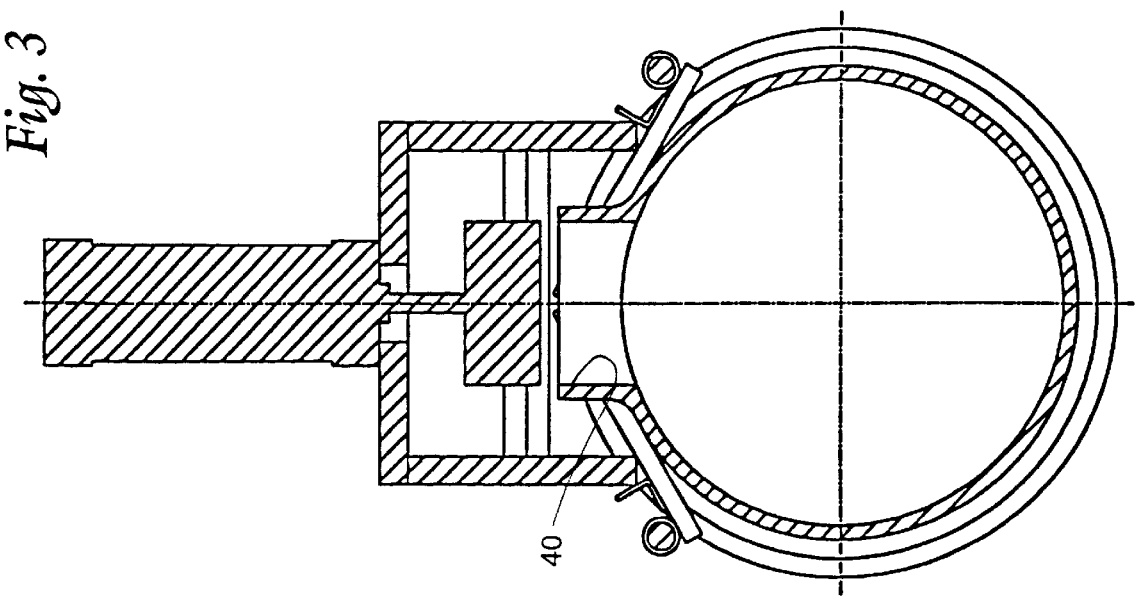
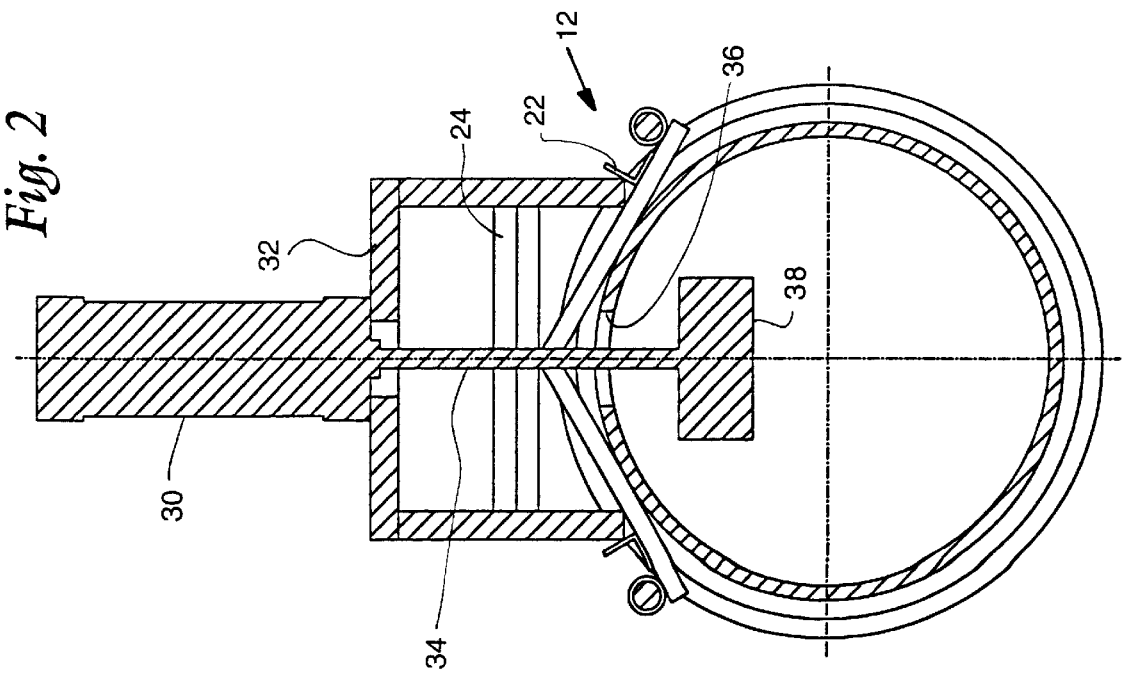

APPARATUS AND METHODS FOR FORMING LATERAL OPENINGS IN MAIN PIPELINES AND RESTRAINING APPARATUS FOR MAIN AND LATERAL PIPE JOINTS

TECHNICAL FIELD

The present invention relates to apparatus and methods for forming lateral openings in main pipelines at a job site enabling securement of a lateral pipe to the main pipeline without use of a joint and also relates to a one-piece integral restraint formed of a plastic material for disposition about the joint between the main pipeline and lateral pipe and relieving the stress at the joint between the main pipeline and lateral pipe.

BACKGROUND

Underground water and sewer lines, e.g., feed lines for residential water and sewer users or irrigation projects such as for golf courses, often employ fittings such as tees, wyes and T-wyes at spaced intervals in the main pipeline and lateral pipes as joints between those pipes. Conventionally, the main and lateral pipes, as well as the fittings, are formed of a plastic material such as polyvinyl chloride and the pipe joints are gasketed to seal the two pipes to the fitting at the joint.

Fabricated fittings for joining opposite ends of sewer pipes such that a lateral pipe can be coupled to the fitting are generally very short in length, i.e., on the order of 2 to 3 feet, and typically have at least one lateral opening formed with a bell. Fittings are conventionally manufactured at a manufacturing site by applying a plug inside the fitting, heating the wall of the fitting where the lateral opening is to be formed and drawing the plug through a pilot opening in the wall to enlarge the opening to form a lateral opening with a flange. Heat is typically applied to the plastic fitting at the manufacturing site by applying a canvas coated with silicone on both the inner and outer sides of the fitting about the pilot hole. Electrical current is applied and the PVC material is heated to approximately 275° F., which softens the material. With the plug inside the fitting and the material softened, the plug is typically pulled downwardly from within the fitting to form the lateral opening or socket. Conventionally, a hydraulic cylinder is used to pull the plug through the pilot hole to enlarge the opening. Once the lateral opening is formed, a short belled section of pipe may be solvent-welded to the flange about the opening to complete the fitting.

At a job site, for example, in a residential tract, water or sewer lines formed of PVC are typically laid alongside a number of residential lots, necessitating numerous lateral connections to provide water and sewer service to the residences. The contractor does not have the capability to form in the field lateral openings along the length of a long pipeline section. Hence, the contractor typically uses the fitting. The PVC pipe is normally provided in large lengths, i.e., on the order of 13 to 20 feet. The joints between these long pipe sections usually do not physically line up with the desired location for the lateral pipes. To construct the joint, the contractor will typically cut the long pipe intermediate its ends, bevel both ends, insert the beveled end into an end of a fitting and insert the end of the next long section into the opposite end of the fitting. The lateral pipe will then be inserted into the bell on the side of the fitting. However, fittings are relatively expensive and costly and laborious to install. As set forth herein, the present invention provides apparatus and methods for forming a lateral opening in a main plastic pipeline at any location along the length of the pipeline and at the job site, thereby eliminating the need for costly fittings.

Further, it will be appreciated that main pipelines and lateral pipes in pressurized fluid systems have a tendency to separate from one another at the joint. For example, water pressure tends to cause a separation of the main and lateral pipes. Customary practice to prevent such separation is to provide a concrete block behind the fitting which, in turn, bears against undisturbed soil so that the water pressure will not separate the lateral pipe from the fitting. Where pipes and fittings formed of metal materials are used, one practice has been to apply a pair of metal collars to the lateral pipe and to the bell of the fitting, with bolts between the collars such that the lateral pipe and fitting cannot be separated under water pressure. This, in effect, makes rigid the joint between the lateral pipe and the fitting and does not afford any Form of stress relief at the joint. Another type of metal restraint at the joint between a lateral pipe and a main pipe comprises three semi-cylindrical metal sections. See, for example, Russian Patent No. SU 1620-765-A. As illustrated there, two semi-circular sections are clamped about the lateral pipe, which also has projections which extend partially about the main pipe at the joint. The projections and portions of the two cylindrical sections about the lateral pipe are secured to a third semi-cylindrical section about the main pipe on a side thereof remote from the lateral pipe to provide a rigid joint. This type of restraint, however, does not afford stress relief at the joint and, in any event, is formed of a multiplicity of parts and parts formed of metal which do not afford resistance to corrosion.

DISCLOSURE OF THE INVENTION

According to the present invention, there are provided apparatus and methods for forming lateral openings in a plastic pipe in the field or at the job site, thereby eliminating the necessity for a fitting and enabling the contractor to form the lateral opening in the main pipeline at selected locations along its length and at nominal cost. To accomplish this, a pilot hole is drilled through the pipe at the selected location. A vee block comprised of two spaced vee sections adjustable longitudinally relative to one another is placed on top of the pipe with the sections on opposite sides of the pilot hole. A line is then drawn through an open end of the pipe and through the pilot hole and a pull plug is attached to the end of the line within the pipe. The line is necessary in most cases because the location of the lateral opening may be a considerable distance, i.e., 6–10 feet, from either end of the main pipeline. Heat is then applied about the pilot opening by applying a silicone-coated canvas material on the outside of the pipe and a torch to the canvas whereby heat is transmitted to and softens the PVC pipe about the pilot hole. Alternatively, electrical heating elements may be used. After the pipe is heated about the pilot hole, a pulling frame which mounts a cylinder is applied to the vee block. The piston of the cylinder is coupled to the pulling plug lying on the inside of the pipe. The plug is then pulled through the pilot hole, displacing the heated material about the pilot opening outwardly to form the flange of the lateral opening. The flange is then beveled and may be attached to a spigot by solvent-welding. A bell fitting may also be applied to the lateral opening. Thus, by forming the opening in the field at the job site, the substantial cost of the previously believed necessary fitting is entirely eliminated.

According to another aspect of the present invention, there is provided a restraint in the form of a sling which extends about the lateral and main pipes or a lateral and a fitting in a manner which resists any tendency of the lateral pipe and the main pipe or the lateral pipe and the fitting to separate from one another and which also relieves the stress at the joint of the lateral pipe with the fitting or main pipe. More particularly, the restraint of the present invention comprises an integral, i.e., unitary one-piece restraint body formed of plastic, preferably polyvinyl chloride material. The body includes a generally semi-circular bend intermediate its opposite ends for receiving the back side of the main pipe or fitting. The opposite ends of the restraint body have arcuate sections about axes generally normal to an axis of the semi-circular intermediate bend of the body for disposition about opposite sides of the lateral pipe. By solvent-welding the sling or restraint body at its arcuate end sections to the lateral pipe, it will be appreciated that any tendency of the main pipe or fitting to separate from the lateral pipe caused by fluid flow w thin the pipe or otherwise would be resisted by the restraint body. Additionally, the restraint body enables a free-floating connection between the lateral pipe and the bell of the fitting. Fatigue stresses at the joint between the lateral and the main pipe or fitting are thereby relieved. By forming the restraint body of similar material as the pipes, i.e., PVC, the restraint body can be readily applied to the joint and solvent-welded to the lateral pipe, eliminating the need for previously required blocking material along the back side of the main pipe or fitting. Moreover, the construction is simple, low in cost and one-piece. By forming the lateral opening at the job site and using the restraint hereof, it will be appreciated that the cost and labor of installing a system, particularly for use in a pressurized fluid system, is substantially reduced.

In a preferred embodiment according to the present invention, a restraint for relieving the fatigue stress at a joint between a main pipe and a lateral pipe, comprising an integral restraint body formed of a plastic material and having a generally semi-circular bend intermediate opposite ends thereof for receiving within the bend a side portion of the main pipe remote from the joint, the opposite ends of the body having arcuate sections about axes generally normal to an axis of the semi-circular bend for securement about respective opposite sides of the lateral pipe whereby, upon securement about the main pipe side portion and the lateral pipe, the body relieves the stress at the joint between the main pipe and the lateral pipe.

In a further preferred embodiment according to the present invention, there is provided in a pipe joint between a fitting formed of a plastic material and a lateral pipe formed of a plastic material, the fitting including a lateral bell defining opening for receiving an end of the lateral pipe and a gasket in the bell for sealing the joint between the fitting and the lateral pipe, a restraint cooperable between the fitting and the lateral pipe and comprising an integral, general U-shaped body formed of plastic material having an arcuate base portion extending about a side of the main pipe remote from the bell and a pair of legs extending from the base portion past the bell and terminating in respective arcuate sections disposed about opposite sides of the lateral pipe, the arcuate sections being solvent-welded about the lateral pipe whereby the restraints substantially relieve the stress of the joint between the fitting and the lateral pipe.

In a still further preferred embodiment according to the present invention, there is provided a method for forming an opening in a main pipe for receiving a lateral pipe, comprising, at an on-site location for the installation of a main pipe, identifying a location for a lateral opening intermediate the ends of the main pipe, forming a pilot hole through the main pipe at the identified location, extending a line between the pilot hole and one end of the main pipe and attaching a pulling plug to the line within the main pipe, heating the plastic material about the pilot hole, pulling the plug into the main pipe and attaching the plug to a piston of the cylinder and pulling the plug through the pilot hole by operation of the cylinder to form a lateral opening with a radially outwardly directed flange.

Accordingly, it is a primary object of the present invention to provide novel and improved apparatus and methods for forming lateral openings in main pipelines in the field or at the job site, eliminating the need for fittings.

Accordingly, it is a another primary object of the present invention to provide a novel and improved restraint system for the joint between a lateral pipe and a main pipe or fitting which resists any tendency of the lateral pipe and the main pipe or fitting to separate and relieves the stress at the joint whereby the joint can be sealed, yet remain free-floating.

BRIEF DESCRIPTION OF THE DRAWINGS

FIG. 2 is an enlarged cross-sectional view thereof prior to the formation of the lateral opening;

FIG. 3 is a view similar to FIG. 2 illustrating the lateral opening as formed by the apparatus;

BEST MODE FOR CARRYING OUT THE INVENTION

Figure 1:
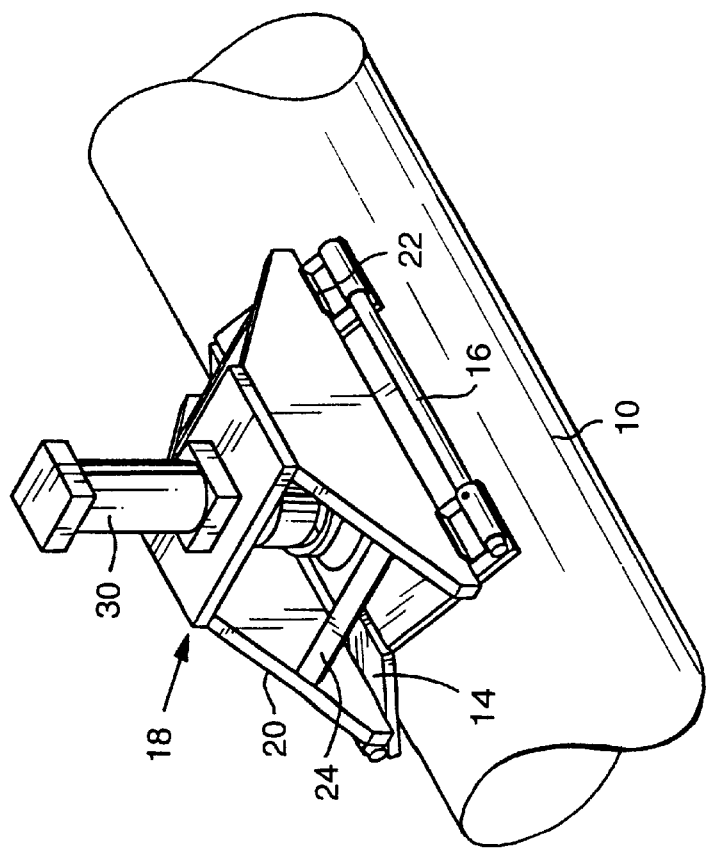
FIG. 1 is a fragmentary perspective view of a main pipeline having apparatus for forming a lateral opening mounted thereon.

Referring now to the drawings, particularly to FIG. 1, there is illustrated an elongated main pipeline 10 in which a lateral opening is to be formed. The pipeline 10 is formed of a plastic material, preferably PVC and may be elongated, for example, on the order of between 13–20 feet as would be typical for a main water pipe in a residential area of an irrigation project, for example, on a golf course. The lateral opening, for example, may be formed along a mid-section of the pipe a substantial distance from the ends of the pipe, e.g., on the order of between 6 and 10 feet and at the job site in accordance with the present invention.

To accomplish the foregoing, a generally V-shaped block, generally designated 12, comprised of a pair of vee sections 14 spaced longitudinally one from the other and coupled to one another by a pair of rods 16. The V-block 12 forms a saddle for resting on the pipeline 10. Integrally connected with the V-block 12 or formed as a separate part distinct from the V-block 12 is a pulling frame, generally designated 18. The frame includes a pair of upright supports 20 which rest against angled plates 22 carried by the V-block such that the V-block 12 supports the pulling frame 20 in a position overlying the pipeline 10. The pulling frame may have various cross-supports 24 to lend rigidity to the frame. The frame mounts a cylinder 30 at a location medially of its opposite ends and sides. The cylinder 30 is mounted on a platform 32 secured to and on top of opposite sides 20 of pulling frame 18. The piston 34 of cylinder 30 extends through an opening in the platform 32 between the vee sections 14 for passage through a pilot hole 36 formed in the pipeline 10. It will be appreciated that the pilot hole is formed prior to application of the pulling frame to the V-block 12. Thus, it will be appreciated that the V-block 12 and pulling frame 18 can be located anywhere along the length of the pipeline 10 in order to form the lateral opening through the pipelines.

Figure 4:
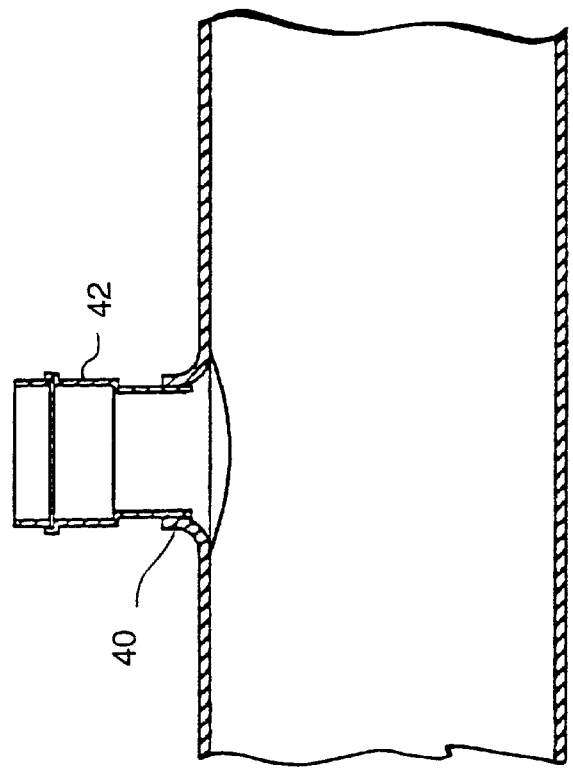
FIG. 4 is a longitudinal cross-sectional view illustrating the main pipeline with a lateral opening formed therein and a spigot attached for receiving a lateral pipe.

To employ the apparatus hereof, the contractor identifies the location along the length of the pipe where it is desired to provide a lateral opening. A pilot hole 36 is then drilled through the pipeline at the identified location. The V-block 12 is placed on the pipe with the end sections 14 thereof straddling the pilot hole 36. The pulling assembly is placed on the vee block (if it is not already integral with the V-block). A line is passed from the end of the pipe 10 through the pilot hole such that a plug may be passed into the pipe and located below the pilot hole opening. The plastic material of the pipeline about the pilot hole 36 is then heated. This can be accomplished by applying silicone-soaked canvas about the pilot hole and heating the canvas with a torch and, hence, heating the plastic about the pilot hole. The pulling assembly 18 may be in place or removed to accomplish this heating and softening of the plastic material. Once softened, the piston 34 of the cylinder 30 is attached to the pulling plug 38 within the pipeline 10. The hydraulic cylinder 30 is then actuated and the pulling plug 38 is drawn through the pilot hole 36 to form the flanged lateral opening 40. A spigot 42 may then be solvent-welded to the flanged lateral opening 40, as illustrated in FIG. 4. The spigot 42 may have a groove for receiving a gasket whereby a lateral pipe may be sealingly received in the spigot to form a sealed free-floating joint. It will also be appreciated that the V-block and pull assembly, whether integral or separate from one another, is lightweight and therefore portable between job sites as well as being low-cost.

Figure 5:
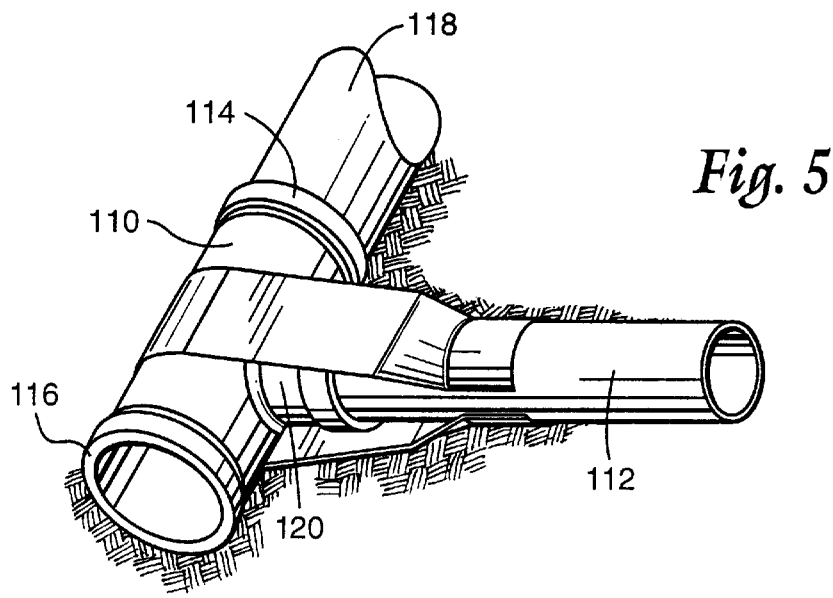
FIG. 5 is a perspective view of a joint between a lateral and a main pipe or fitting illustrating a restraint about the joint in accordance with the present invention.
Figure 6:
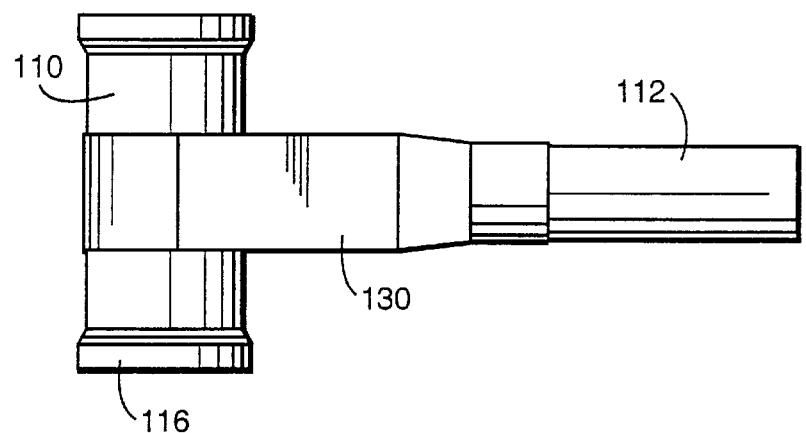
FIG. 6 is a top plan view thereof.
Figure 7:
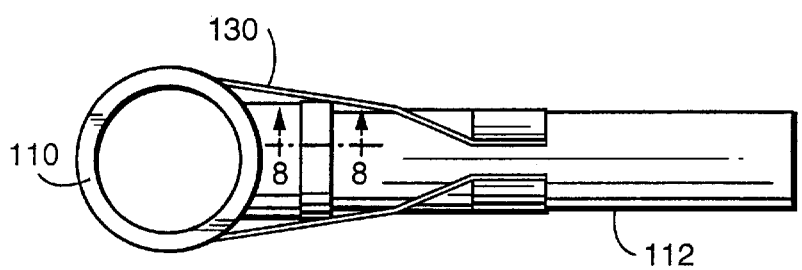
FIG. 7 is a side elevational view thereof.
Figure 8:
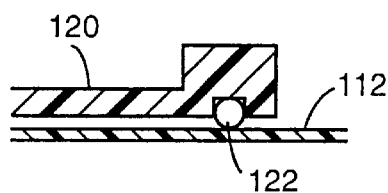
FIG. 8 is an enlarged fragmentary cross-sectional view of the lateral pipe sealed in the bell of the fitting.
Figure 11:
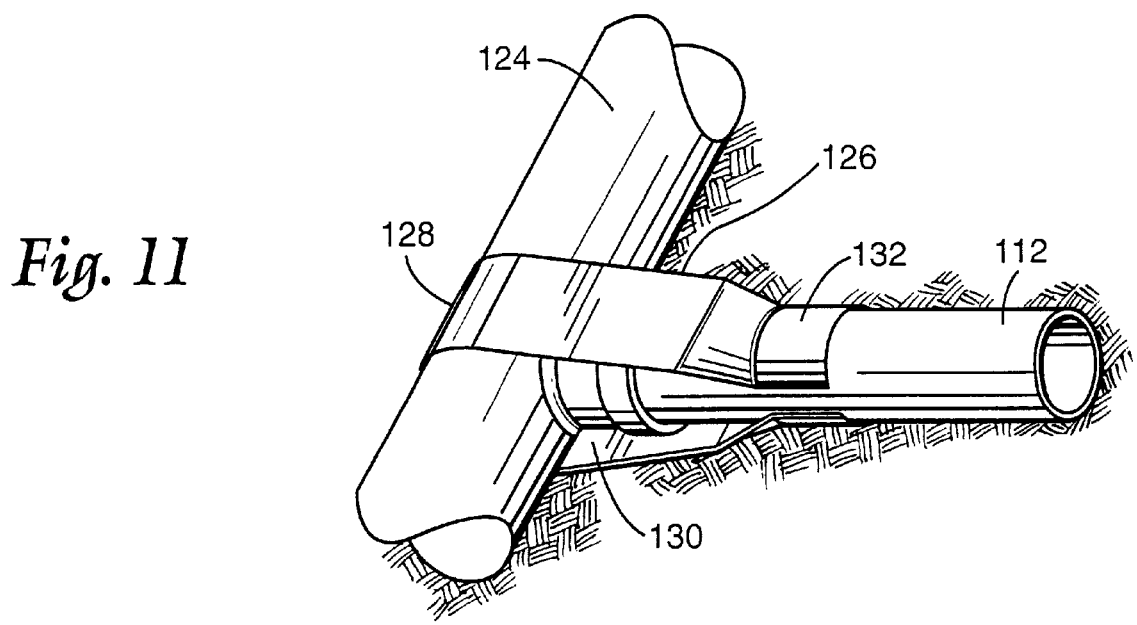
FIG. 11 is a perspective view similar to FIG. 1 illustrating a joint between a lateral and a main pipe with the restraint hereof.

In FIG. 5, there is illustrated a joint between a fitting 110 and a lateral pipe 112. The fitting 110 includes a pair of end bells 114 and 116 for securement to main pipes, one of which is illustrated at 118. It will be appreciated that the fitting 110 also has a lateral bell 120 for receiving the end of the lateral pipe 112. Each of the bells has a gasket, for example, the gasket 122 illustrated in FIG. 3, for sealing with the main or lateral pipe as applicable, with the joint being free-floating. As illustrated in FIG. 11, the lateral pipe 112 may also be coupled directly to main pipe 124, employing the restraint system of the present invention. In this latter configuration, the main pipe 124 has a lateral opening preferably formed by the system described in FIGS. 1–4 and to which opening a bell or spigot may be secured for receiving the end of the lateral pipe. The fitting 110, lateral pipe 112, main pipe 124, as well as the pipelines 118 and the restraint system of the present invention are all formed of a plastic material, for example, polyvinyl chloride.

The restraint system includes a restraint body 126 which is formed of an integral, i.e., one-piece unitary plastic construction. The body 126 is elongated and includes a semi-circular bend or base portion 123 intermediate its opposite ends. The bend 128 may be sized to the size of the pipe section, i.e., the fitting 110 or main pipe 124, such that the bend and fitting or main pipe section have common axes. Alternatively, and in view of the somewhat flexible nature of the material forming the restraint body 126, the bend need not be particularly sized to the circumference of the fitting 110 or main pipe 124 but one size thereof may accommodate a number of variations in fitting or main pipe sizes.

Figure 9:
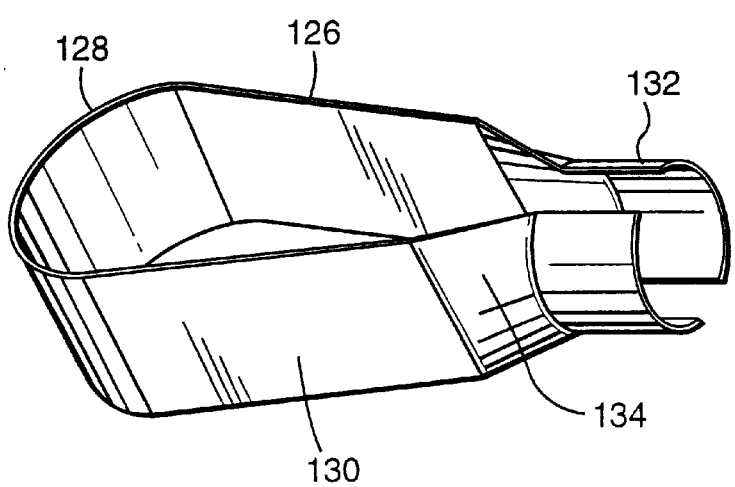
FIG. 9 is a perspective view of the restraint.
Figure 10:
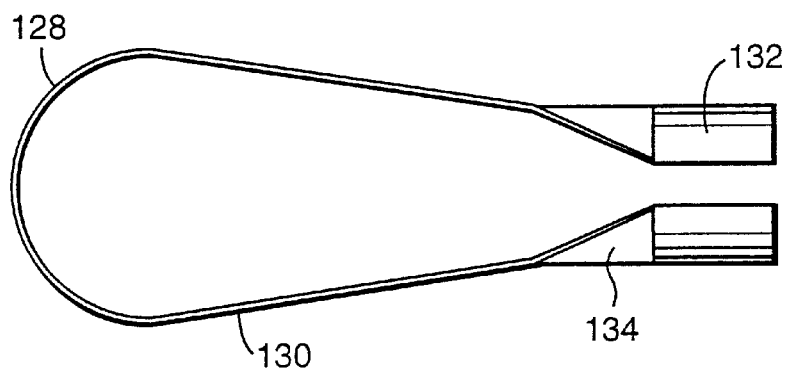
FIG. 10 is a side elevational view of the restraint.

As best illustrated in FIGS. 9 and 10, the restraint body is generally U-shaped in configuration, with leg portions 130 thereof extending from the bend or base portion 128 to terminate in arcuate sections 132. As illustrated, the arcuate sections 132 are generally semi-circular and are formed about axes generally normal or perpendicular to the axis of the bend or base portion 128. From a review of the drawing figures, it will be appreciated that the legs 130 are flat for the majority of their length and include transition sections 134 for transitioning between the flat sections of legs 130 and the arcuate sections 132 thereof.

To form the restraint body 126, it will be appreciated that the body can be molded. However, it has been found that the restraint body 126 can be readily formed from a length of a conventional plastic pipe such as PVC. For example, by slitting, the pipe may be flattened between its opposite end portions by the application of heat. The arcuate end sections 132 are formed by the unheated remaining opposite ends of the circular pipe, the transition sections 134 being formed by heating and forming the material between the flat section 130 and arcuate sections 132. In this manner, a simple cost-effective formation of the restraint body 126 can be obtained.

To use the restraint body, the fluid system is laid in the ground in a conventional manner but without any blocking behind the joints formed by the fittings 110 or main pipe 124 and the lateral pipe 112. The restraint body 126 may be disposed about the fitting 1 10 or main pipe 124 as applicable prior to forming the joint, with the bend 128 extending along the back side of the fitting or main pipe and the legs straddling the remaining portion of the fitting or main pipe, the bell 120 or spigot 42 and portions of the lateral pipe 112. A conventional chemical solvent-welding process may then be used to secure the arcuate sections 132 to the lateral pipe 112. Securement between the restraint body 126 and the fitting 110 or main pipe 124 is not required. From the foregoing description, it will be appreciated that any tendency of the lateral pipe and the fitting 110 or main pipe 124 towards separation from one another is resisted by the restraint body, particularly by tensioning the leg sections 130. With this construction, the joint between the lateral pipe 112 and the bell 120 is not stressed and may be free-floating. That is, any stresses applied to the joint by shifting of the pipes, particularly in a direction toward separation, is taken up by the restraint body and the joint between the lateral pipe and the bell is essentially stress-relieved.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In combination, a main pipe, a lateral pipe and a restraint for relieving the fatigue stress at a joint between the main pipe and the lateral pipe, comprising:

an integral restraint body formed of a plastic material and having a generally semi-circular bend intermediate opposite ends thereof for receiving within the bend a side portion of the main pipe remote from the joint;

said opposite ends of said body having arcuate sections about axes generally normal to an axis of said semi-circular bend for securement externally about respective opposite sides of the lateral pipe, said main pipe and said lateral pipe being formed of a plastic material and secured to one another independent of said restraint body, and a chemical solvent for welding said arcuate sections about opposite sides of said lateral pipe, whereby, upon securement about the main pipe side portion and the lateral pipe, said body relieves the stress at the joint between the main pipe and the lateral pipe.

2. The combination according to claim 1 wherein said plastic material comprises polyvinyl chloride.

3. In a pipe joint between a fitting formed of a plastic material and a lateral pipe formed of a plastic material, said fitting including a lateral bell defining an opening for receiving an end of said lateral pipe and a gasket in said bell for sealing the joint between the fitting and the lateral pipe, a restraint cooperable between said fitting and said lateral pipe and comprising an integral, general U-shaped body formed of plastic material having an arcuate base portion extending about a side of said main pipe remote from said bell and a pair of legs extending from said base portion past said bell and terminating in respective arcuate sections disposed externally about opposite sides of said lateral pipe, said arcuate sections being solvent-welded about said lateral pipe whereby said restraint substantially relieves the stress of the joint between the fitting and the lateral pipe.

4. A combination according to claim 3 wherein the joint between the lateral pipe and the main pipe is non-load bearing.

5. A combination according to claim 3 wherein said body includes a pair of generally flat sections intermediate said arcuate base portion and said arcuate sections for disposition along opposite sides of said fitting and said lateral pipe and a pair of transition sections transitioning between said flat sections and said arcuate sections.

6. A pipe joint according to claim 3 wherein said plastic material comprises polyvinyl chloride.

7. A combination according to claim 3 wherein said fitting and said lateral pipe are secured to one another independent of said restraint.

8. A restraint for relieving the fatigue stress at a joint between a main pipe and a lateral pipe, comprising:

an integral restraint body formed of a plastic material and having a generally semi-circular bend intermediate opposite ends thereof for receiving within the bend a side portion of the main pipe remote from the joint;

said opposite ends of said body having arcuate sections about axes generally normal to an axis of said semi-circular bend for securement about respective opposite sides of the lateral pipe whereby, upon securement about the main pipe side portion and the lateral pipe, said body relieves the stress at the joint between the main pipe and the lateral pipe, said body including a pair of generally flat sections intermediate said semi-circular bend and said arcuate sections for disposition along opposite sides of said main pipe and said lateral pipe and a pair of transition sections intermediate said flat sections and said arcuate sections transitioning between said flat sections and said arcuate sections.

* * * * *